United States Patent
Huang et al.

(10) Patent No.: US 10,380,996 B2
(45) Date of Patent: Aug. 13, 2019

(54) METHOD AND APPARATUS FOR CORRECTING SPEECH RECOGNITION RESULT, DEVICE AND COMPUTER-READABLE STORAGE MEDIUM

(71) Applicant: BAIDU ONLINE NETWORK TECHNOLOGY (BEIJING) CO., LTD., Beijing (CN)

(72) Inventors: Jun Huang, Beijing (CN); Xiangang Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/938,286

(22) Filed: Mar. 28, 2018

(65) Prior Publication Data

US 2019/0005946 A1 Jan. 3, 2019

(30) Foreign Application Priority Data

Jun. 28, 2017 (CN) .......................... 2017 1 0508531

(51) Int. Cl.
*G10L 15/16* (2006.01)
*G10L 15/06* (2013.01)
*G10L 15/04* (2013.01)
*G10L 15/22* (2006.01)

(52) U.S. Cl.
CPC .............. *G10L 15/16* (2013.01); *G10L 15/04* (2013.01); *G10L 15/063* (2013.01); *G10L 15/22* (2013.01)

(58) Field of Classification Search
CPC ........ G10L 15/16; G10L 15/04; G10L 15/063; G10L 15/22; G10L 15/26; G10L 2015/223; G06F 16/353; G06F 17/2785
See application file for complete search history.

(56) References Cited

U.S. PATENT DOCUMENTS

| | | | |
|---|---|---|---|
| 6,658,377 B1 * | 12/2003 | Anward | G06F 17/271 704/9 |
| 9,940,933 B2 * | 4/2018 | Choi | G10L 15/183 |
| 9,984,683 B2 * | 5/2018 | Li | G10L 15/16 |
| 10,019,438 B2 * | 7/2018 | Audhkhasi | G06F 17/28 |
| 10,198,435 B2 * | 2/2019 | Na | G06F 17/2735 |
| 2008/0167872 A1 * | 7/2008 | Okimoto | G10L 15/22 704/251 |
| 2014/0257805 A1 * | 9/2014 | Huang | G10L 15/063 704/232 |
| 2016/0163310 A1 * | 6/2016 | Lee | G10L 15/16 704/232 |
| 2017/0018272 A1 * | 1/2017 | Lee | H04N 21/4394 |
| 2018/0114522 A1 * | 4/2018 | Hall | G10L 13/047 |
| 2018/0174589 A1 * | 6/2018 | Choi | G10L 15/32 |
| 2018/0308487 A1 * | 10/2018 | Goel | G10L 15/1815 |

* cited by examiner

*Primary Examiner* — Mohammad K Islam
(74) *Attorney, Agent, or Firm* — Hodgson Russ LLP

(57) ABSTRACT

A method and apparatus for correcting a speech recognition result, a device and a computer-readable storage medium are provided. The method includes performing speech recognition on acquired speech data to obtain initial text information; and recognizing and correcting the initial text information by a neural machine translation NMT model to obtain a final text recognition result.

12 Claims, 5 Drawing Sheets

METHOD AND APPARATUS FOR CORRECTING SPEECH RECOGNITION RESULT, DEVICE AND COMPUTER-READABLE STORAGE MEDIUM

CROSS-REFERENCE TO RELATED APPLICATION

This application claims priority to and benefits of Chinese Patent Application Serial No. 201710508531.5, filed with the State Intellectual Property Office of P. R. China on Jun. 28, 2017, the entire content of which is incorporated herein by reference.

FIELD

The present disclosure generally relates to the field of speech recognition technology, and more particularly to a method and apparatus for correcting a speech recognition result, a device and a computer-readable storage medium.

BACKGROUND

With the rapid improvement of computer processing capacity, speech recognition technology, a technology that transforms speech signals into corresponding texts or commands through recognizing and analyzing processes, has developed rapidly. The speech recognition technology is widely applied in many fields, such as speech input system, speech control system, intelligent dialogue query system and so on, and is changing the way of human life and production.

With speech interaction, the most natural interactive way, is increasingly popularized, the demand on accuracy of the speech recognition becomes increasingly higher. At present, for the speech recognition technology, the recognition performance is improved mainly through training a complex acoustic model with a large amount of training data and recognizing an inputted speech by the acoustic model.

However, the accuracy of the speech recognition by the acoustic model needs to be further improved.

SUMMARY

Embodiments of the present disclosure provide a method and apparatus for correcting a speech recognition result, a device and a computer-readable storage medium, which can improve the accuracy of speech recognition.

Embodiments of the present disclosure provide a method for correcting a speech recognition result, including:

performing speech recognition on acquired speech data to obtain initial text information; and recognizing and correcting the initial text information by a neural machine translation (NMT) model to obtain a final text recognition result.

Embodiments of the present disclosure provide an apparatus for correcting a speech recognition result, including:

a speech recognizing module configured to perform speech recognition on acquired speech data to obtain initial text information; and a text correcting module configured to recognize and correct the initial text information by a neural machine translation NMT model to obtain a final text recognition result.

Embodiments of the present disclosure provide a device, including:

one or more processors;

a memory for storing one or more programs that, when executed by the one or more processors, cause the one or more processors to perform the method for correcting a speech recognition result as described in any embodiment of the first aspect of the present disclosure.

Embodiments of the present disclosure provide a computer-readable storage medium having stored therein a computer program that, when executed by a processor, cause the processor to perform a method for correcting a speech recognition result as described in any embodiment of the first aspect of the present disclosure.

DETAILED DESCRIPTION

Figure 1:
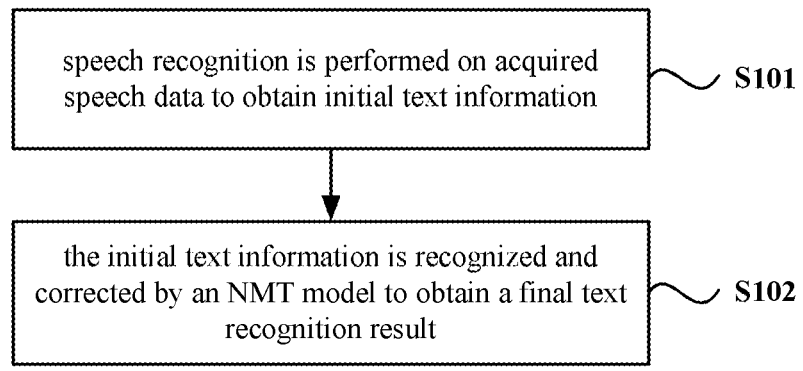
FIG. 1 is a flow chart of a method for correcting a speech recognition result according to embodiment 1 of the present disclosure.

In order to make objects, technical solutions and advantages of the present disclosure clearer, embodiments of the present disclosure will be described in detail below with reference to drawings. It will be appreciated that, these embodiments described herein are only used to explain the present disclosure, and shall not be construed to limit the present disclosure.

Furthermore, it should be illustrated that, for convenience of description, only part related to the present disclosure is shown in the drawings, rather than the entire contents of the present disclosure. Before discussing the embodiments in more detail, it should be mentioned that some embodiments are described as processes or methods depicted as a flow chart. Although various operations (or steps) are sequentially described in the flow chart, many of these operations (or steps) may be implemented in parallel, concurrently or simultaneously. In addition, the order of operations (or steps) can be rearranged. When operations are completed, the processing may be terminated, but additional steps not shown in the drawings may also be included. The processing may correspond to methods, functions, procedures, subroutines, subprograms and the like.

Embodiment 1

FIG. 1 is a flow chart of a method for correcting a speech recognition result according to embodiment 1 of the present disclosure. This embodiment is applicable to correct the speech recognition result. The method can be executed by an apparatus for correcting a speech recognition result according to embodiments of the present disclosure. The apparatus can be implemented by means of software and/or hardware, and can be integrated in a terminal device or provided in an application client of the terminal device. The terminal device can be but not limited to a mobile terminal, such as a tablet computer or a smart phone.

The application client may be a plug-in of a client provided in the terminal device and works cooperatively with a client for correcting a speech recognition result provided in the terminal device. The application client may also be a plug-in of an operating system of the terminal device, and works cooperatively with an application program for correcting a speech recognition result provided in the operating system of the terminal device. Moreover, the application client may also be such an independent client in the terminal device that can provide correction for the speech recognition result, which will not be limited in this embodiment of the present disclosure.

As shown in FIG. 1, the method in this embodiment includes the following blocks.

At block 101, speech recognition is performed on acquired speech data to obtain initial text information.

The speech data is a speech signal acquired by a terminal device, which may be an original speech signal or a speech signal after noise elimination and feature extraction.

Specifically, the speech data may be acquired through a microphone, a speech input unit, or a recording unit of the terminal device. The terminal device includes, but is not limited to, a mobile terminal device (such as iPhone, a tablet computer, a mobile phone, etc.), a fixed terminal device (such as a desktop computer or a television, etc.) or a wearable device (such as, a smart watch, a smart bracelet, etc.).

The acquired speech data is preliminary recognized with a speech recognition algorithm to obtain the initial text information. The available speech recognition algorithm may be, but is not limited to, a Deep Neural Network (DNN) algorithm, a Long Short-Term Memory (LSTM) algorithm, a Convolutional Neural Network (CNN) algorithm, where the DNN algorithm is of a good classification ability, the LSTM algorithm is of a long-term memory ability, and the CNN algorithm can learn some invariant features in speech features. Furthermore, these three algorithms can be used in combination to obtain the initial text information.

At block 102, the initial text information is recognized and corrected by an NMT model to obtain a final text recognition result.

The NMT model is obtained by training known speech data, i.e., by automatically learning from a large amount of known speech data through neural network, thus allowing greatly improved text recognition and correction, and thereby obtaining the final text recognition result with high quality.

Specifically, the NMT model can be obtained as follows: performing speech recognition on the known speech data and taking recognized text information as source data; marking correct text information corresponding to the known speech data, and taking marked text information as target data; and training the source data and the target data to obtain the NMT model.

Specifically, the text information obtained by performing speech recognition on the known speech data and the correct text information are respectively segmented to obtain at least one word for an aligning process, and resulting aligned words are inputted into the NMT model for training and learning, thereby obtaining an NMT model with a text recognizing and correcting ability.

Afterwards, the initial text information is inputted into the NMT model, and the NMT model will correct incorrect words in the initial text information according to the text recognizing and correcting ability pre-learned.

In this embodiment of the present disclosure, the initial text information obtained by speech recognition is recognized and corrected with the NMT model, such that the final text recognition result is obtained with higher accuracy, thereby improving accuracy of the speech recognition.

Embodiment 2

Figure 2A:
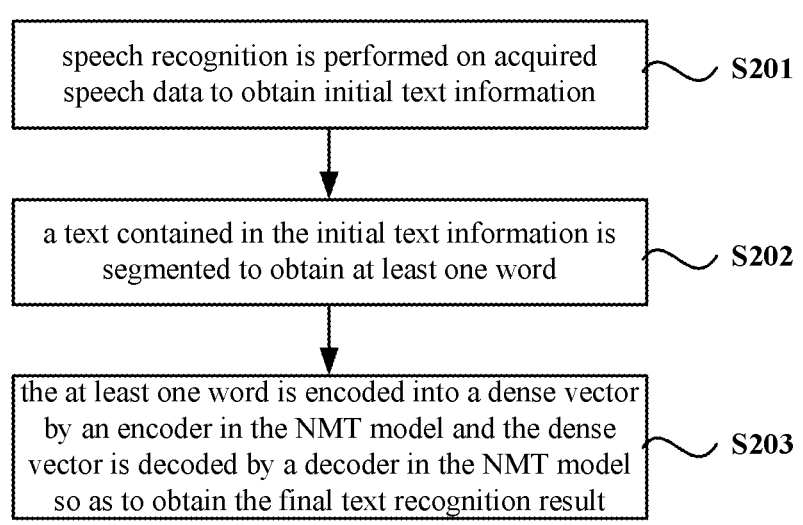
FIG. 2A is a flow chart of a method for correcting a speech recognition result according to embodiment 2 of the present disclosure.

FIG. 2A is a flow chart of a method for correcting a speech recognition result according to embodiment 2 of the present disclosure. This embodiment provides optimization on the basis of embodiment 1. In this embodiment, recognizing and correcting the initial text information by a NMT model to obtain a final text recognition result is further optimized to be: segmenting a text contained in the initial text information to obtain at least one word; and encoding the word into a dense vector by an encoder in the NMT model and decoding the dense vector by a decoder in the NMT model so as to obtain the final text recognition result.

Correspondingly, as shown in FIG. 2A, the method according to this embodiment specifically includes the following blocks.

At block 201, speech recognition is performed on acquired speech data to obtain initial text information.

At block 202, a text contained in the initial text information is segmented to obtain at least one word.

Specifically, the text contained in the initial text information can be segmented according to semantic analysis. For example, if the text contained in the initial text information is "I like the Baidu map", then according to the semantic analysis, the text can be segmented into "I", "like", and "the Baidu map".

At block 203, the at least one word is encoded into a dense vector by an encoder in the NMT model and the dense vector is decoded by a decoder in the NMT model so as to obtain the final text recognition result.

The NMT model includes the encoder and the decoder, both of which are obtained by training known speech data, i.e., by automatically learning from a large amount of known speech data through neural network, which allows the encoder and the decoder to learn some information in a recognized text and a correct text corresponding to the known speech data, such that the final text recognition result can be obtained based on the learned text information when using the NMT model to recognize and correct the initial text information, thereby improving the quality of text recognition greatly.

The dense vector is a vector where a ratio of non-zero elements to all elements is greater than a preset ratio (such as 90%), i.e., a vector having a larger proportion of non-zero elements.

Figure 2B:
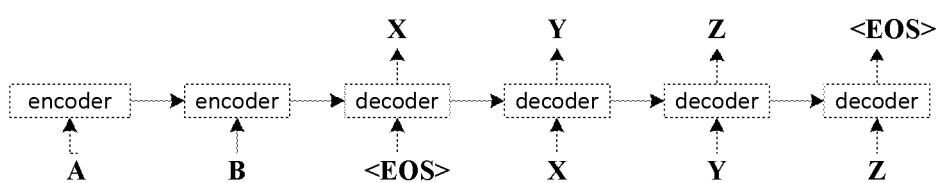
FIG. 2B is a schematic diagram showing an encoding-decoding process in the method for correcting a speech recognition result according to embodiment 2 of the present disclosure.

Specifically, as shown in FIG. 2B, obtained words (such as A and B shown in FIG. 2B) corresponding to the initial text information are successively inputted into the encoder of the NMT model to generate a dense vector corresponding to each word, then generated dense vectors are successively inputted into the decoder to obtain encoding results X, Y, Z.

In this embodiment, the text contained in the initial text information is segmented to obtain at least one word, the word obtained is encoded into the dense vector by the encoder in the NMT model and the dense vector is then decoded by the decoder in the NMT model, such that the final text recognition result is obtained with higher accuracy, thereby improving accuracy of the speech.

Embodiment 3

Figure 3A:
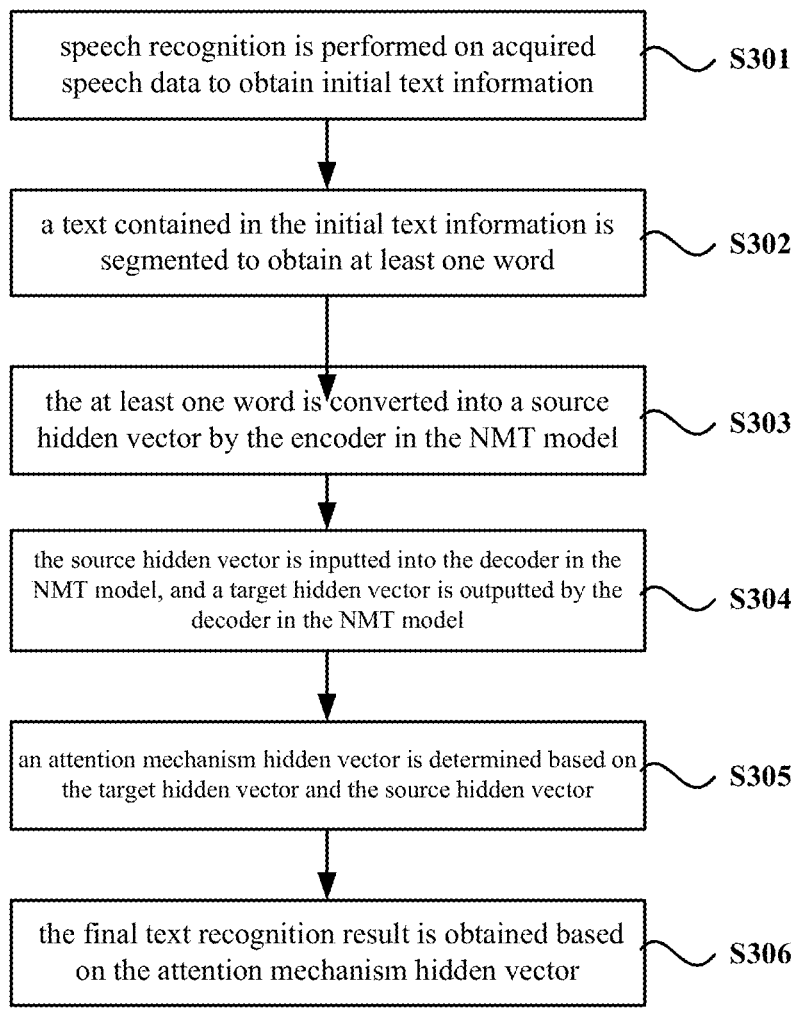
FIG. 3A is a flow chart of a method for correcting a speech recognition result according to embodiment 3 of the present disclosure.

FIG. 3A is a flow chart of a method for correcting a speech recognition result according to embodiment 3 of the present disclosure. This embodiment provides optimization on the basis of above embodiments. In this embodiment, encoding the word into the dense vector by the encoder in the NMT model and decoding the dense vector by the decoder in the NMT model so as to obtain the final text recognition result is further optimized to be: converting the at least one word into a source hidden vector by the encoder in the NMT model; inputting the source hidden vector into the decoder in the NMT model, and outputting a target hidden vector by the decoder in the NMT model; determining an attention mechanism hidden vector based on the target hidden vector and the source hidden vector; and obtaining the final text recognition result based on the attention mechanism hidden vector.

Correspondingly, as shown in FIG. 3A, the method according to this embodiment specifically includes the following blocks.

At block 301, speech recognition is performed on acquired speech data to obtain initial text information.

At block 302, a text contained in the initial text information is segmented to obtain at least one word.

At block 303, the at least one word is converted into a source hidden vector by the encoder in the NMT model.

The NMT model further includes at least one computing node, and the computing node is configured to convert the at least one word into the source hidden vector. Alternatively, the word processed by the encoder and the decoder included in the NMT model needs to pass through the computing node. Alternatively, the encoder and the decoder each include at least one computing node.

Figure 3B:
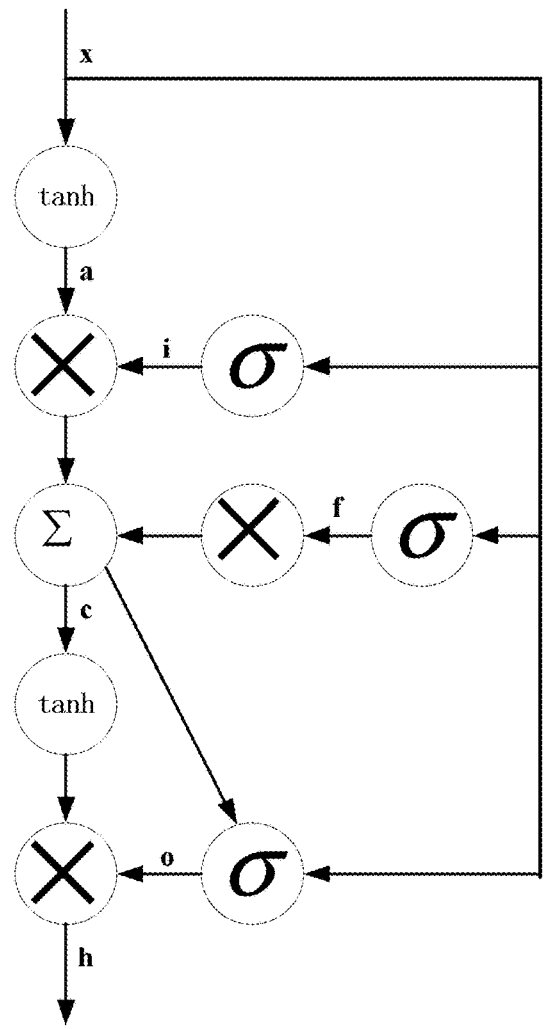
FIG. 3B is a schematic diagram showing a computing node in the method for correcting a speech recognition result according to embodiment 3 of the present disclosure.

An example structure of the computing node is shown in FIG. 3B, where x represents input data, h represents output data, i.e., a hidden vector, tan h represents a hyperbolic tangent function, × represents a multiplication calculation, Σ represents an addition calculation, σ represents a sigmoid function, and a, I, f, c and o represents intermediate variables generated during the calculation. That is, the input data is inputted into the computing node by which a series of calculations (such as function, multiplication) are performed, and then the hidden vector is outputted.

In this embodiment, the input data and output data for the encoder are different from that for the decoder. For the encoder, the input data x is a word, and the output data h is a source hidden vector. For the decoder, the input data x is a source hidden vector, and the output data h is a target hidden vector. Therefore, the source hidden vector can be obtained by inputting the input data corresponding to the encoder into the above computing node, and the target hidden vector can be obtained by inputting the input data corresponding to the decoder into the above computing node.

At block 304, the source hidden vector is inputted into the decoder in the NMT model, and a target hidden vector is outputted by the decoder in the NMT model.

At block 305, an attention mechanism hidden vector is determined based on the target hidden vector and the source hidden vector.

As attention mechanism has a great promoting effect on sequence learning tasks, data weighted conversion can be performed on encoded data by introducing the attention mechanism to the encoder of the NMT model, and/or weighted conversion can be performed on decoded data by introducing the attention mechanism is to the encoder of the NMT model, thereby effectively improving system performance of sequence vs sequence in a natural mode. Therefore, accuracy of text recognition can be further improved by introducing the attention mechanism into this embodiment.

Alternatively, a center position of the source hidden vector is outputted by the decoder in the NMT model, a source hidden vector of a word at at least one preset position is acquired according to the center position; an aligning weight is calculated based on the source hidden vector of the word at the at least one preset position and the target hidden vector, and a context vector is obtained based on the aligning weight; and the attention mechanism hidden vector is calculated based on the context vector and the target hidden vector.

A position near the center position can be selected as the preset position.

Figure 3C:
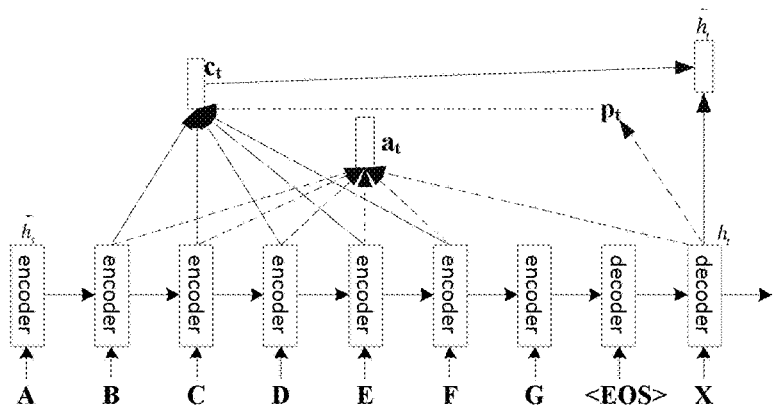
FIG. 3C is a schematic diagram showing hidden state calculation by introducing attention mechanism to the method for correcting a speech recognition result according to embodiment 3 of the present disclosure.

Specifically, as shown in FIG. 3C, an output pt at a current time t (i.e., a center position of the source hidden vector) is firstly obtained from a target hidden vector; an aligning weight $a_t$ is then calculated based on source hidden vectors of words at the center position, 10 positions on the left and 10 positions on the right thereof; a context vector $c_t$ is obtained based on the weight value $a_t$; then an attention mechanism hidden vector $\tilde{h}_t$ is calculated based on the context vector $c_t$ and the target hidden vector; and a final output is obtained based on attention mechanism hidden vector $\tilde{h}_t$.

In addition, for further improving the accuracy of text recognition, the attention mechanism hidden vector can be input as a feedback into the decoder in the NMT model.

Figure 3D:
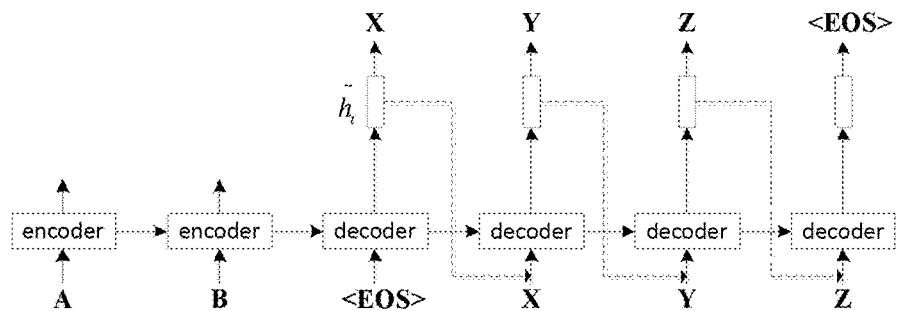
FIG. 3D is a schematic diagram showing hidden state calculation by introducing obtained attention mechanism hidden vector as a feedback to the method for correcting a speech recognition result according to embodiment 3 of the present disclosure.

Specifically, the attention mechanism hidden vector at the current time t is used as the input for the decoder to calculate an attention mechanism hidden vector at a next time. As shown in FIG. 3D, the attention mechanism hidden vector $\tilde{h}_t$ is connected to an input end of the decoder to improve decoding performance.

At block 306, the final text recognition result is obtained based on the attention mechanism hidden vector.

Specifically, the final text recognition result can be obtained by analyzing the attention mechanism hidden vector.

In this embodiment, the attention mechanism hidden vector is determined based on the source hidden vector outputted by the encoder and the target hidden vector outputted by the decoder, and the final text recognition result is obtained based on the attention mechanism hidden vector, such that accuracy of text recognition is further improved.

Embodiment 4

Figure 4:
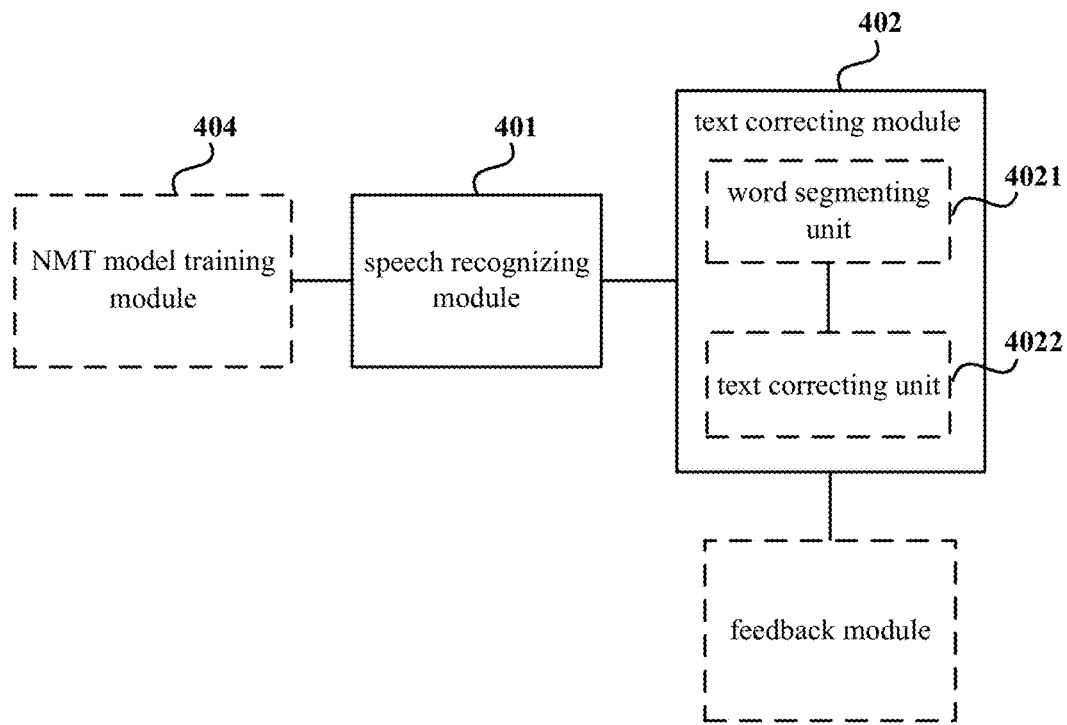
FIG. 4 is a block diagram of an apparatus for correcting a speech recognition result according to embodiment 4 of the present disclosure.

FIG. 4 is a block diagram of an apparatus for correcting a speech recognition result according to embodiment 4 of the present disclosure. This embodiment is applicable to correct the speech recognition result. The apparatus can be implemented in software and/or hardware, and can be integrated in a terminal device or provided in an application client of the terminal device. The terminal device can be but not limited to a mobile terminal, such as a tablet computer or a smart phone.

The application client may be a plug-in of a client provided in the terminal device and works cooperatively with a client for correcting a speech recognition result provided in the terminal device. The application client may also be a plug-in of an operating system of the terminal device, and works cooperatively with an application program for correcting a speech recognition result provided in the operating system of the terminal device. Moreover, the application client may also be such an independent client in the terminal device that can provide correction for the speech recognition result, which will not be limited in this embodiment of the present disclosure.

As shown in FIG. 4, the apparatus includes: a speech recognizing module 401 and a text correcting module 402.

The speech recognizing module 401 is configured to perform speech recognition on acquired speech data to obtain initial text information.

The text correcting module 402 is configured to recognize and correct the initial text information by a neural machine translation NMT model to obtain a final text recognition result.

The apparatus for correcting the speech recognition result according to this embodiment is configured to execute the method for correcting the speech recognition result as described in any of the above embodiments, the technical principle of the apparatus and technical effects achieved by the apparatus are similar to that of the method, and will not be elaborated herein.

On the basis of the above embodiments, the text correcting module 402 includes a word segmenting unit 4021 and a text correcting unit 4022.

The word segmenting unit 4021 is configured to segment a text contained in the initial text information to obtain at least one word.

The text correcting unit 4022 is configured to encode the at least one word into a dense vector by an encoder in the NMT model and decode the dense vector by a decoder in the NMT model so as to obtain the final text recognition result.

On the basis of the above embodiments, the text correcting unit 4022 is specifically configured to: convert the at least one word into a source hidden vector by the encoder in the NMT model; input the source hidden vector into the decoder in the NMT model and output a target hidden vector by the decoder in the NMT model; determine an attention mechanism hidden vector based on the target hidden vector and the source hidden vector; and obtain the final text recognition result based on the attention mechanism hidden vector.

On the basis of the above embodiments, the text correcting unit 4022 is specifically configured to: output a center position of the source hidden vector by the decoder in the NMT model and acquire a source hidden vector of a word at at least one preset position according to the center position; calculate an aligning weight based on the source hidden vector of the word at the at least one preset position and the target hidden vector, and obtain a context vector based on the aligning weight; and calculate the attention mechanism hidden vector based on the context vector and the target hidden vector.

On the basis of the above embodiments, the apparatus further includes a feedback module 403.

The feedback module 403 is configured to input the attention mechanism hidden vector as a feedback into the decoder in the NMT model.

On the basis of the above embodiments, the apparatus further includes an NMT model training module 404.

The NMT model training module 404 is configured to perform speech recognition on known speech data and take recognized text information as source data; mark correct text information corresponding to the known speech data, and take marked text information as target data; and train the source data and the target data to obtain the NMT model.

The apparatus for correcting the speech recognition result as described in each of the above embodiments can execute the method for correcting the speech recognition result as described in any of the above embodiments, includes corresponding functional modules for executing the method for correcting the speech recognition result, and can achieve the corresponding beneficial effects.

Embodiment 5

Figure 5:
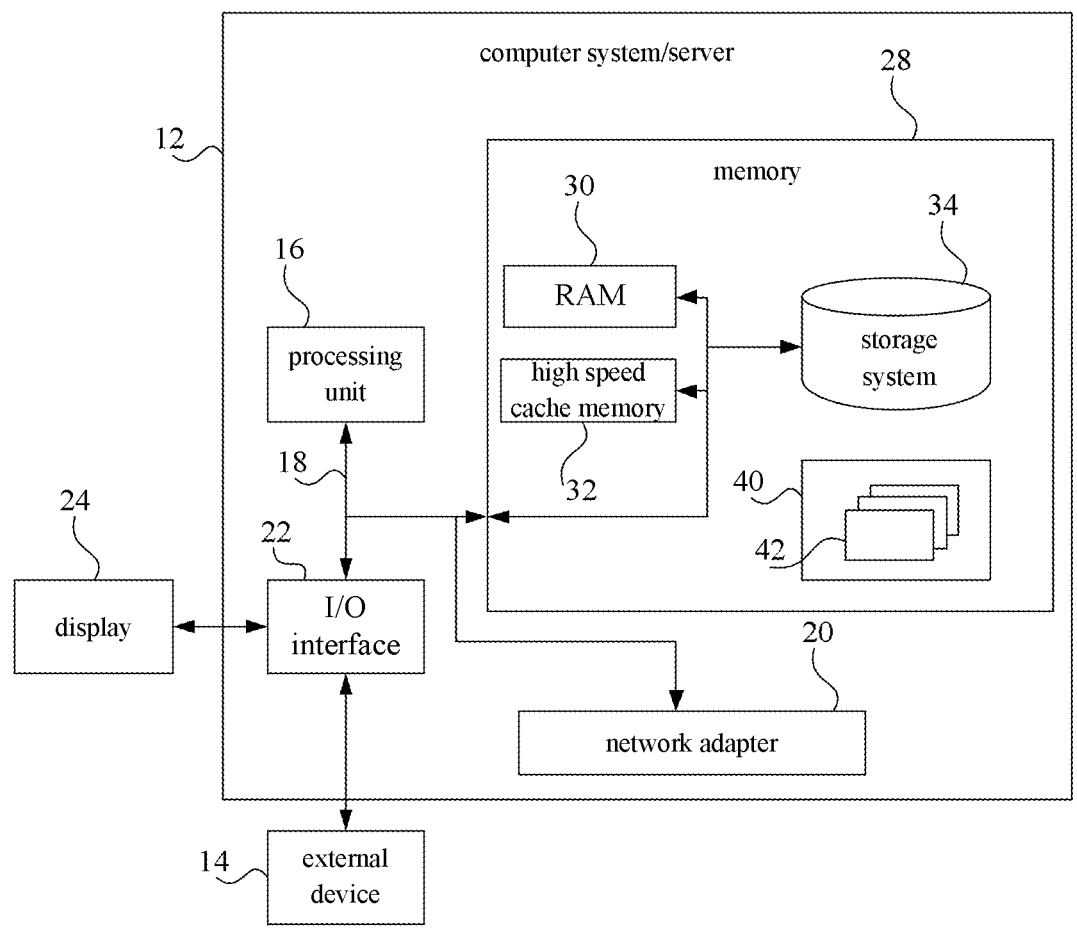
FIG. 5 is a schematic diagram of a device according to embodiment 5 of the present disclosure.

FIG. 5 is a schematic diagram of a device according to embodiment 5 of the present disclosure, which shows a block diagram of a computer device 12 suitable for implement embodiments of the present disclosure. The computer device 12 shown in FIG. 5 is merely an example, which should not be considered as a limitation to functions and application scopes of embodiments of the present disclosure.

As illustrated in FIG. 5, the computer device 12 may be represented as a general computer device form. Components of the computer device 12 may be but are not limited to one or more processors or processing units 16, a system memory 28, a bus 18 connecting various system components including the system memory 28 and the processing units 16.

The bus 18 represents one or more of several types of bus structures, including a memory bus or a memory controller, a peripheral bus, an accelerated graphics port, a processor, or a local bus using any of a variety of bus structures. For example, these architectures may be, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (hereinafter referred to as PCI) bus.

The computer device 12 typically includes a variety of computer system readable media. These media may be any available media accessible by the computer device 12 and includes both volatile and non-volatile media, removable and non-removable media.

The system memory 28 may include a computer system readable medium in the form of volatile memory, such as a random access memory 30 (hereinafter referred to as RAM) and/or a high speed cache memory 32. The computer device 12 may further include other removable or non-removable, volatile or non-volatile computer system storage media. By way of example only, the storage system 34 may be configured to read and write a non-removable and non-volatile magnetic media (not shown in FIG. 5, commonly referred to as a "hard drive"). Although not shown in FIG. 5, a magnetic disk driver for reading from and writing to a removable and non-volatile magnetic disk (such as "floppy disk") and a disk driver for a removable and non-volatile optical disk (such as compact disk read only memory (CD-ROM), Digital Video Disc Read Only Memory (DVD-ROM) or other optical media) may be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The computer device 12 may also communicate with one or more external devices 14 (such as, a keyboard, a pointing device, a display 24, etc.). Furthermore, the computer device 12 may also communicate with one or more communication devices enabling a user to interact with the computer device 12 and/or other devices (such as a network card, modem, etc.) enabling the computer device 12 to communicate with one or more computer devices. This communication can be performed via the input/output (I/O) interface 22. Moreover, the computer device 12 may communicate with one or more networks (such as a local area network (hereafter referred to as LAN), a wide area network (hereafter referred to as WAN) and/or a public network such as an Internet) through a network adapter 20. As shown in FIG. 5, the network adapter 20 communicates with other modules of the computer device 12 over the bus 18. It should be understood that, although not shown in FIG. 5, other hardware and/or software modules may be used in connection with the computer device 12. The hardware and/or software includes, but is not limited to, microcode, device drivers, redundant processing units, external disk drive arrays, RAID systems, Drive and data backup storage system.

The processing unit 16 is configured to execute various functional applications and data processing by running programs stored in the system memory 28, for example, implementing the speaker adaption method provided in embodiments of the present disclosure.

The processing unit 16 is configured to execute various functional applications and data processing by running programs stored in the system memory 28, for example, implementing the method for correcting the speech recognition result provided in embodiments of the present disclosure. The method includes performing speech recognition on acquired speech data to obtain initial text information; and recognizing and correcting the initial text information by a neural machine translation NMT model to obtain a final text recognition result.

Further, recognizing and correcting the initial text information by the neural machine translation NMT model to obtain the final text recognition result includes segmenting a text contained in the initial text information to obtain at least one word; and encoding the at least one word into a dense vector by an encoder in the NMT model and decoding the dense vector by a decoder in the NMT model so as to obtain the final text recognition result.

Further, encoding the word into the dense vector by the encoder in the NMT model and decoding the dense vector by the decoder in the NMT model so as to obtain the final text recognition result includes converting the at least one word into a source hidden vector by the encoder in the NMT model; inputting the source hidden vector into the decoder in the NMT model, and outputting a target hidden vector by the decoder in the NMT model; determining an attention mechanism hidden vector based on the target hidden vector and the source hidden vector; and obtaining the final text recognition result based on the attention mechanism hidden vector.

Further, determining the attention mechanism hidden vector based on the target hidden vector and the source hidden vector includes outputting a center position of the source hidden vector by the decoder in the NMT model, and acquiring a source hidden vector of a word at at least one preset position according to the center position; calculating an aligning weight based on the source hidden vector of the word at the at least one preset position and the target hidden vector, and obtaining a context vector based on the aligning weight; and calculating the attention mechanism hidden vector based on the context vector and the target hidden vector.

Embodiment 6

Embodiment 6 of the present disclosure also provides a computer-readable storage medium having stored therein a computer program that, when executed by a processor, causes the processor to perform the method for correcting the speech recognition result as described in all embodiments hereinbefore. The method includes performing speech recognition on acquired speech data to obtain initial text information; and recognizing and correcting the initial text information by a neural machine translation NMT model to obtain a final text recognition result.

Further, recognizing and correcting the initial text information by the neural machine translation NMT model to obtain the final text recognition result includes segmenting a text contained in the initial text information to obtain at least one word; and encoding the at least one word into a dense vector by an encoder in the NMT model and decoding the dense vector by a decoder in the NMT model so as to obtain the final text recognition result.

Further, encoding the word into the dense vector by the encoder in the NMT model and decoding the dense vector by the decoder in the NMT model so as to obtain the final text recognition result includes converting the at least one word into a source hidden vector by the encoder in the NMT model; inputting the source hidden vector into the decoder in the NMT model, and outputting a target hidden vector by the decoder in the NMT model; determining an attention mechanism hidden vector based on the target hidden vector and the source hidden vector; and obtaining the final text recognition result based on the attention mechanism hidden vector.

Further, determining the attention mechanism hidden vector based on the target hidden vector and the source hidden vector includes outputting a center position of the source hidden vector by the decoder in the NMT model, and acquiring a source hidden vector of a word at at least one preset position according to the center position; calculating an aligning weight based on the source hidden vector of the word at the at least one preset position and the target hidden vector, and obtaining a context vector based on the aligning weight; and calculating the attention mechanism hidden vector based on the context vector and the target hidden vector.

The computer-readable storage medium according to embodiments of the present disclosure may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing a program. The program may be used by an instruction executed system, apparatus or device, or a connection thereof.

The computer readable signal medium may include a data signal propagating in baseband or as part of a carrier which carries a computer readable program code. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport a program used by an instruction executed system, apparatus or device, or a connection thereof.

The program code stored on the computer readable medium may be transmitted using any appropriate medium, including but not limited to wireless, wire, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

Reference throughout this specification to "an embodiment", "some embodiments", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example" or "in some examples" in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for correcting a speech recognition result, comprising:
    performing speech recognition on acquired speech data to obtain initial text information; and
    recognizing and correcting the initial text information by a neural machine translation NMT model to obtain a final text recognition result;
    wherein recognizing and correcting the initial text information by the neural machine translation NMT model to obtain the final text recognition result comprises:
        segmenting a text contained in the initial text information to obtain at least one word; and
        encoding the at least one word into a dense vector by an encoder in the NMT model and decoding the dense vector by a decoder in the NMT model so as to obtain the final text recognition result;
    wherein encoding the word into the dense vector by the encoder in the NMT model and decoding the dense vector by the decoder in the NMT model so as to obtain the final text recognition result comprises:
        converting the at least one word into a source hidden vector by the encoder in the NMT model;
        inputting the source hidden vector into the decoder in the NMT model, and outputting a target hidden vector by the decoder in the NMT model;
        determining an attention mechanism hidden vector based on the target hidden vector and the source hidden vector; and
        obtaining the final text recognition result based on the attention mechanism hidden vector.

2. The method according to claim 1, wherein determining the attention mechanism hidden vector based on the target hidden vector and the source hidden vector comprises:
    outputting a center position of the source hidden vector by the decoder in the NMT model, and acquiring a source hidden vector of a word at at least one preset position according to the center position;
    calculating an aligning weight based on the source hidden vector of the word at the at least one preset position and the target hidden vector, and obtaining a context vector based on the aligning weight; and
    calculating the attention mechanism hidden vector based on the context vector and the target hidden vector.

3. The method according to claim 2, further comprising:
    inputting the attention mechanism hidden vector as a feedback into the decoder in the NMT model.

4. The method according to claim 1, further comprising:
    performing speech recognition on known speech data and taking recognized text information as source data;
    marking correct text information corresponding to the known speech data, and taking marked text information as target data; and
    training the source data and the target data to obtain the NMT model.

5. An apparatus for correcting a speech recognition result, comprising:
    one or more processors;
    a memory;

one or more software modules stored in the memory and executed by the one or more processors, and comprising:
  a speech recognizing module configured to perform speech recognition on acquired speech data to obtain initial text information; and
  a text correcting module configured to recognize and correct the initial text information by a neural machine translation NMT model to obtain a final text recognition result;
wherein the text correcting module comprises:
  a word segmenting unit configured to segment a text contained in the initial text information to obtain at least one word; and
  a text correcting unit configured to encode the at least one word into a dense vector by an encoder in the NMT model and decode the dense vector by a decoder in the NMT model so as to obtain the final text recognition result;
wherein the text correcting unit is configured to convert the at least one word into a source hidden vector by the encoder in the NMT model; input the source hidden vector into the decoder in the NMT model and output a target hidden vector by the decoder in the NMT model; determine an attention mechanism hidden vector based on the target hidden vector and the source hidden vector; and obtain the final text recognition result based on the attention mechanism hidden vector.

6. The apparatus according to claim 1, wherein the text correcting unit is configured to output a center position of the source hidden vector by the decoder in the NMT model and acquire a source hidden vector of a word at at least one preset position according to the center position; calculate an aligning weight based on the source hidden vector of the word at the at least one preset position and the target hidden vector, and obtain a context vector based on the aligning weight; and calculate the attention mechanism hidden vector based on the context vector and the target hidden vector.

7. The apparatus according to claim 6, further comprising:
  a feedback module configured to input the attention mechanism hidden vector as a feedback into the decoder in the NMT model.

8. The apparatus according to claim 5, further comprising:
  an NMT model training module configured to perform speech recognition on known speech data and take recognized text information as source data; mark correct text information corresponding to the known speech data, and take marked text information as target data; and train the source data and the target data to obtain the NMT model.

9. A non-transitory computer-readable storage medium having stored therein a computer program that, when executed by a processor, causes the processor to perform a method for correcting a speech recognition result, the method for correcting a speech recognition result comprising:
  performing speech recognition on acquired speech data to obtain initial text information; and
  recognizing and correcting the initial text information by a neural machine translation NMT model to obtain a final text recognition result;
  wherein recognizing and correcting the initial text information by the neural machine translation NMT model to obtain the final text recognition result comprises:
    segmenting a text contained in the initial text information to obtain at least one word; and
    encoding the at least one word into a dense vector by an encoder in the NMT model and decoding the dense vector by a decoder in the NMT model so as to obtain the final text recognition result;
  wherein encoding the word into the dense vector by the encoder in the NMT model and decoding the dense vector by the decoder in the NMT model so as to obtain the final text recognition result comprises:
    converting the at least one word into a source hidden vector by the encoder in the NMT model;
    inputting the source hidden vector into the decoder in the NMT model, and outputting a target hidden vector by the decoder in the NMT model;
    determining an attention mechanism hidden vector based on the target hidden vector and the source hidden vector; and
    obtaining the final text recognition result based on the attention mechanism hidden vector.

10. The method according to claim 9, wherein determining the attention mechanism hidden vector based on the target hidden vector and the source hidden vector comprises:
  outputting a center position of the source hidden vector by the decoder in the NMT model, and acquiring a source hidden vector of a word at at least one preset position according to the center position;
  calculating an aligning weight based on the source hidden vector of the word at the at least one preset position and the target hidden vector, and obtaining a context vector based on the aligning weight; and
  calculating the attention mechanism hidden vector based on the context vector and the target hidden vector.

11. The method according to claim 10, further comprising:
  inputting the attention mechanism hidden vector as a feedback into the decoder in the NMT model.

12. The method according to claim 9, further comprising:
  performing speech recognition on known speech data and taking recognized text information as source data;
  marking correct text information corresponding to the known speech data, and taking marked text information as target data; and
  training the source data and the target data to obtain the NMT model.

* * * * *